United States Patent [19]

Lemire et al.

[11] Patent Number: 4,987,861
[45] Date of Patent: Jan. 29, 1991

[54] APPARATUS FOR SPRAYING ANIMALS

[75] Inventors: Paul-Emile Lemire, Ancienne Lorette; Jean-Pierre Boyer, Brossard, both of Canada

[73] Assignee: Les Plastiques Lemire, Inc., Ville Vanier, Canada

[21] Appl. No.: 465,972

[22] Filed: Jan. 16, 1990

[51] Int. Cl.⁵ .............................................. A01K 29/00
[52] U.S. Cl. ................................... 119/159; 119/156
[58] Field of Search ...................... 119/156, 159, 160

[56] References Cited

U.S. PATENT DOCUMENTS

| | | | |
|---|---|---|---|
| 2,238,872 | 4/1941 | Mather et al. | 119/159 |
| 2,529,530 | 11/1950 | Abildgaard et al. | 119/159 |
| 2,542,280 | 2/1951 | Knapp | 119/159 |
| 2,600,602 | 6/1952 | Abildgaard | 119/159 |
| 2,608,952 | 9/1952 | Herbert | 119/159 |
| 2,665,665 | 1/1954 | Jones | 119/159 |
| 2,684,658 | 7/1954 | Richardson et al. | 119/159 |
| 3,108,574 | 10/1963 | Albers | 119/159 |
| 3,541,996 | 11/1970 | Brockelsby et al. | 119/159 |
| 3,602,199 | 8/1971 | Diggs | 119/159 |

FOREIGN PATENT DOCUMENTS 522029 4/1956 Canada .
628306 6/1949 United Kingdom .
1477836 9/1973 United Kingdom .

Primary Examiner—Gene Mancene
Assistant Examiner—R. Thomas Price
Attorney, Agent, or Firm—Eckert Seamans Cherin & Mellott

[57] ABSTRACT

The disclosure herein describes an apparatus which is adapted to be mounted adjacent to an entranceway for spraying animals passing through the entranceway. It comprises an inverted U-shaped tubular structure with an upper portion and opposite side portions, each portion including a vaporizing unit and connecting members each having one end received in the vaporizing unit of the upper portion and an opposite end portion in the vaporizing unit of an adjacent one of the side portions. A unit is mounted to the structure for detecting the presence of an animal in the entranceway and conduits extend in the connecting members and the vaporizing units for directing the spraying fluid from a remote reservoir to the vaporizing units.

7 Claims, 3 Drawing Sheets

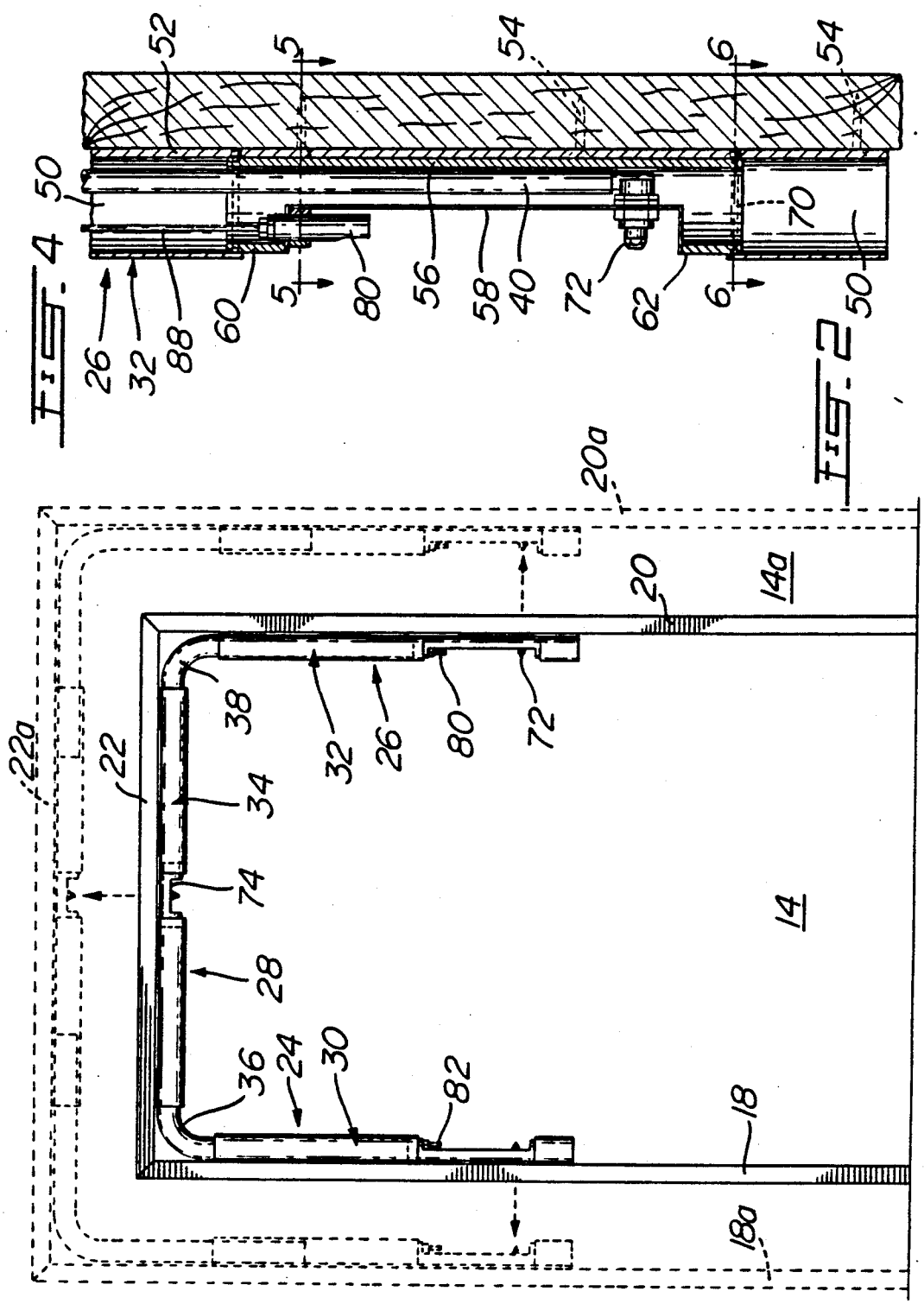

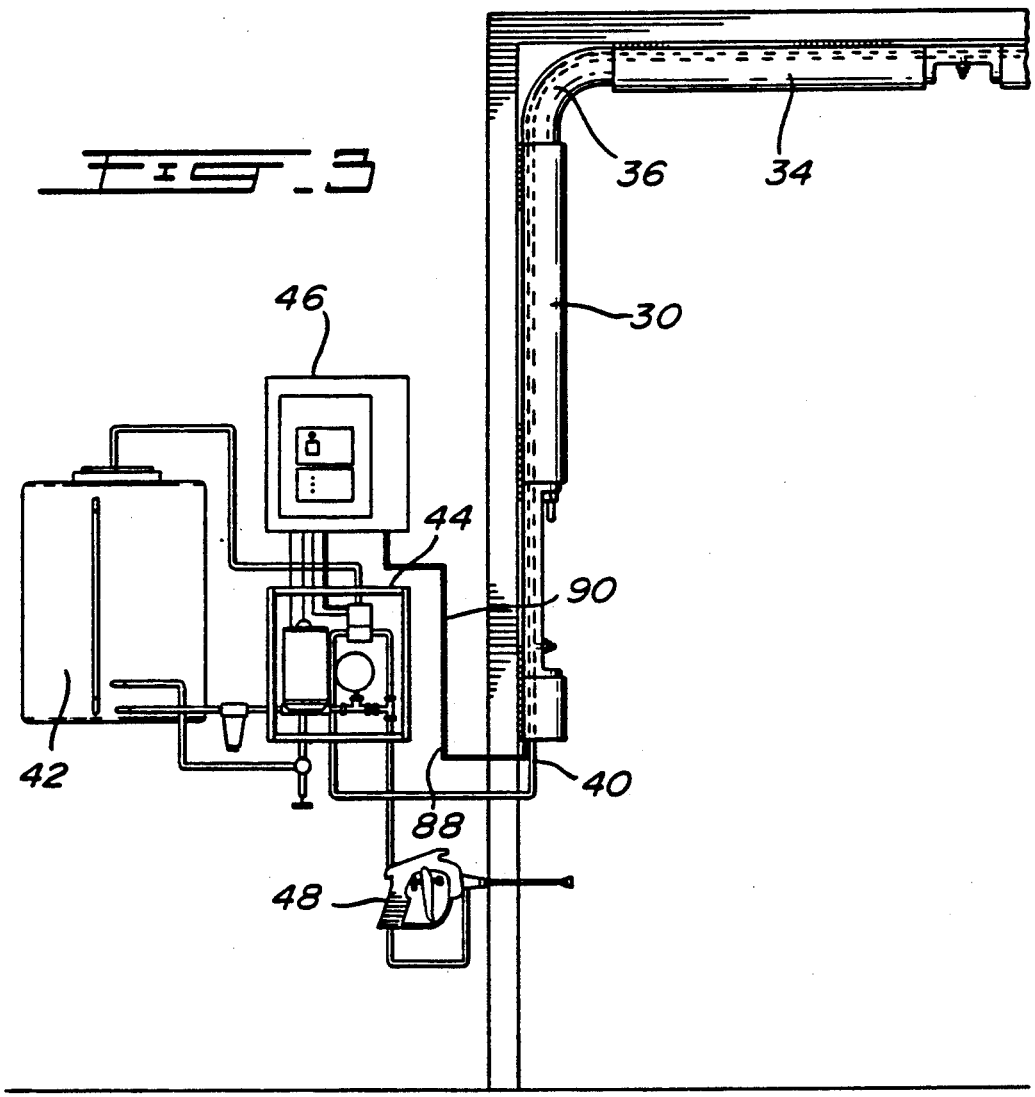
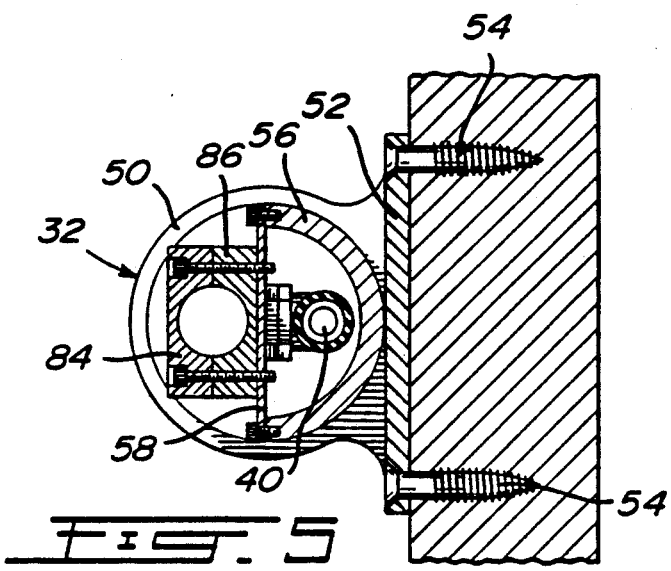

APPARATUS FOR SPRAYING ANIMALS

FIELD OF THE INVENTION

The present invention relates to an apparatus for spraying animals as they pass through an entranceway; more particularly, the invention pertains to an animal spraying apparatus which is adapted to be mounted to varying dimensions of entranceways.

BACKGROUND OF THE INVENTION

Livestock sprayers are known wherein a pressure spray of liquid insecticide or the like is subjected to the livestock from spray nozzles to carry out a wetting of the animals. Among the various methods known, some involve passing the animal through a race, such as described in British patent No. 1,477,836 published June 29, 1977, or in U.S. Pat. No. 2,529,530 issued Nov. 14, 1950 to Abildgaard et al.; others consist in passing the animal through a spray chute, such as described in U.S. Pat. No. 2,542,280 issued Feb. 20, 1951 to Knapp.

U. S. Pat. No. 3,541,996 issued Nov. 24, 1970 to EBKO INDUSTRIES INC. describes a U-shaped housing adapted to fit about the periphery of an entranceway and is equipped with pump and spray means and with an actuator arm adapted to be moved by the animal in order to pump the spraying fluid through a spraying nozzle assembly.

These systems are bulky and require many structural components in order to effect the spraying of the animal passing through the race or the entranceway. Furthermore, each system is constructed to a particular size, none being equipped with means allowing them to adjust to various dimensions of entranceways.

OBJECTS AND STATEMENT OF THE INVENTION

It is an object of the present invention to provide an animal spraying apparatus which is adapted to be mounted to the frame of an entranceway and which is capable of adjustment in accordance with the particular configuration of the entranceway.

It is also an object of the present invention to provide an animal spraying apparatus with rotatable components allowing it to be mounted within the entranceway frame or outside thereof, adjacent to the entranceway, and to carry out an effective wetting of the animals.

It is a further object of the present invention to provide an animal spraying apparatus wherein the detecting of the presence of an animal in the entranceway automatically causes the spraying operation to begin.

The present invention therefore relates to an animal spraying apparatus which comprises an inverted U-shaped tubular structure adapted to be mounted to a particular entranceway frame and consisting of a pair of opposite side portions adapted to be mounted to the side jambs of the entranceway and of an intermediate horizontal upper portion adapted to be mounted to the head of the entranceway. Each of the upper and side portions includes: a vapourizing unit consisting of a housing adapted to be mounted to the entranceway frame and of nozzle carrying means mounted to the housing. The apparatus further comprises connecting members each having one end received in the housing of the upper portion and an opposite end thereof received in the housing of an adjacent one of the side portions. The apparatus also includes means for detecting the presence of an animal in the entranceway and means in the housings and in the connecting members for directing spraying fluid from a remote reservoir to the nozzle carrying means when an animal is present in the entranceway.

In one particular form of the invention, there is provided a telescopic arrangement between the ends of the connecting members and the housings in which they are received so as to be able to fit to various dimensions of entranceway frames.

Other objects and further scope of applicability of the present invention will become apparent from the detailed description given hereinafter. It should be understood, however, that this detailed description, while indicating preferred embodiments of the invention, is given by way of illustration only, since various changes and modifications within the spirit and scope of the invention will become apparent to those skilled in the art.

BRIEF DESCRIPTION OF THE DRAWINGS

FIG. 2 is an elevational view showing the spraying apparatus being mounted to the inner frame components of an entranceway with dotted lines to show its adjustability to be mounted to a larger size entranceway;

FIG. 3 is a partial elevational view of the spraying apparatus of FIG. 2 illustrating accessory components used in cooperation with the spraying apparatus of the present invention;

FIG. 4 is an elevational cross-sectional view of a vapourizing unit provided on each side portion of the inverted U-shaped tubular structure (this figure is shown on the sheet illustrating FIG. 2);

FIG. 5 is a cross-sectional view taken along lines 5—5 of FIG. 4; and

DESCRIPTION OF PREFERRED EMBODIMENTS

Figure 1:
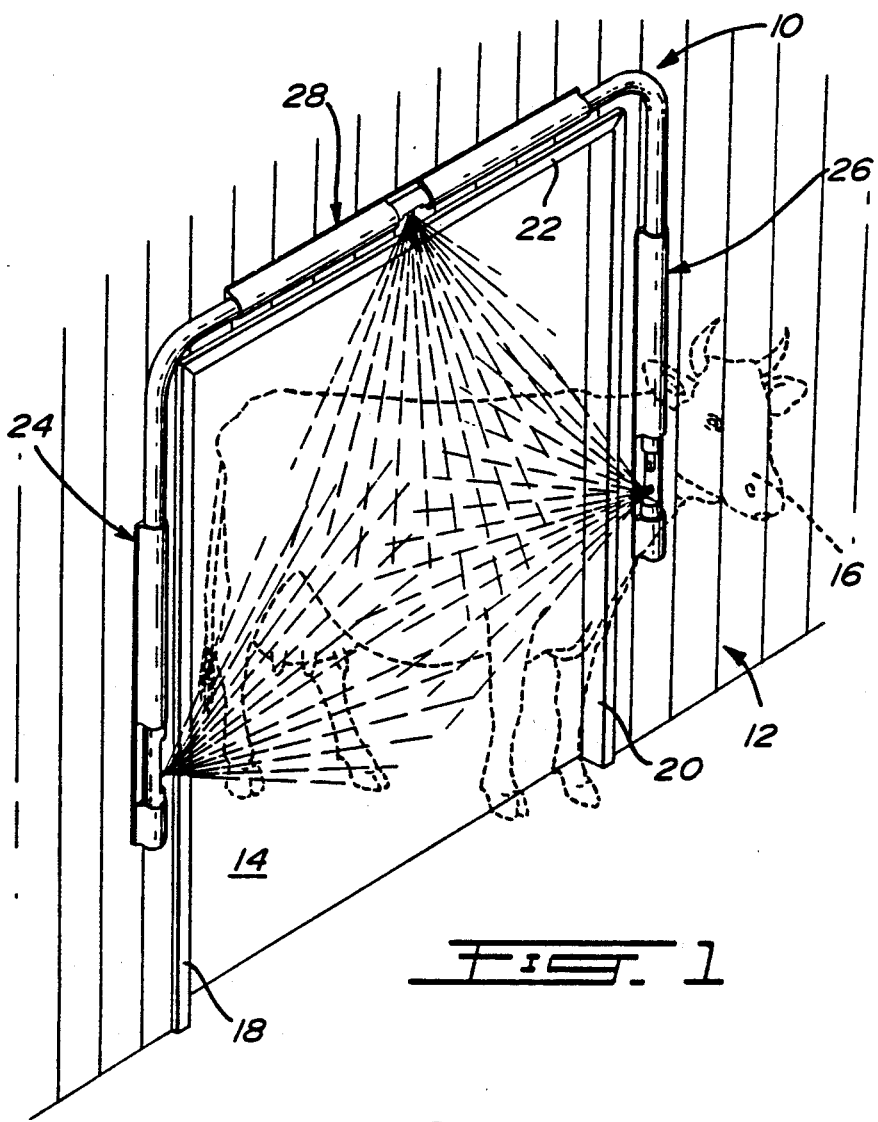
FIG. 1 is a perspective view of the spraying apparatus of the present invention mounted to the adjacent outside side wall of an entranceway frame.

Referring to FIG. 1, the spraying apparatus of the present invention, generally denoted 10, is shown being mounted to a wall 12 adjacent to an entranceway 14 through which livestock (illustrated by doted line 16) may enter or exit. The entranceway is defined by a frame that includes a pair of opposite side jambs 18 and 20 and an intermediate horizontal head 22.

The spraying apparatus 10 defines an inverted U-shaped tubular structure consisting of a pair of opposite side portions 24 and 26 mounted adjacent the side jambs 18 and 20, respectively, and of an intermediate horizontal upper portion 28 adapted to be mounted adjacent to the head of the entranceway frame.

In the embodiment illustrated in FIG. 2, portions 24, 26 and 28 are mounted to the inner planar faces of the side jambs 18 and 20 and head 22. This figure shows that the inverted U-shaped structure 10 is adapted to be mounted to an entranceway 14a having a dimension different from that of the entranceway 14 (as illustrated by the dotted lines representing frame components 18a, 20a and 22a).

Each of the upper and side portions of the inverted U-shaped tubular structure includes a vapourizing unit 30, 32, 34 and bent connecting hollow members 36, 38. Member 36 has one end received in unit 30 and its opposite end received in unit 34 while member 38 has one end received in unit 32 and its opposite end received in unit 34.

As illustrated in FIG. 3, the spraying fluid is channeled to each vapourizing unit by means of a conduit 40 connected to a fluid reservoir 42 through a pumping unit 44 electrically connected to a control module 46. A detailed description of the operation of these various components is not considered essential for the operation of the present invention, these components being well known in the art. Optionnaly, an additional vapourizing gun 48 may be added to the system.

Figure 6:
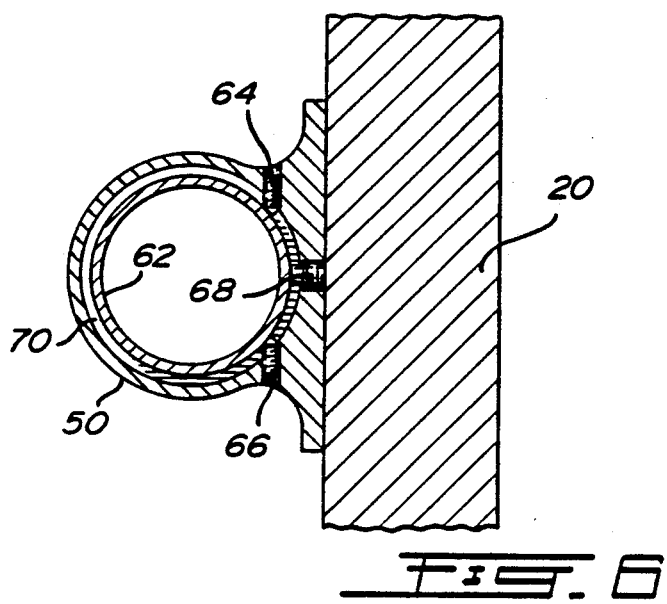
FIG. 6 is a cross-sectional view taken along lines 6—6 of FIG. 4 (this figure is shown on the sheet illustrating FIG. 1).

Referring to FIGS. 4 and 5, the vapourizing unit 32 mounted to the side jamb 20 of the entranceway frame comprises a hollow tubular housing 50 having a flat rear wall 52 adapted to rest against the inner planar face of the side jamb 20 to which it is secured by appropriate fastening means 54. Housing 50 has a cut-out portion 56 in which is vertically mounted a plate 58 having a rectangular main portion and upper and lower cylindrical portions 60 and 62 received within adjacent opened upper and lower portions of the housing 50. As illustrated in FIG. 6, these cylindrical portions 60 and 62 are rotatably adjustable relative to the housing 50 and are secured therein by means of a plurality of tightening screws 64, 66 and 68 which extend through the housing 50 and engaged in an annular recess 70 in the outer wall of each cylindrical portion 60, 62.

The main portion of the plate 58 carries a nozzle 72 which is in fluid connection with the conduit 40.

The construction of the opposite vapourizing unit 24 is identical to that of the vapourizing unit 26 described above; hence, a detailed description of its construction will no be repeated.

The construction of the vapourizing unit 28 is somewhat similar to that of vapourizing units 24 and 26 with the exception, however, that the nozzle carrying plate 74 is somewhat smaller in size as well as the cut-out portion of housing 34 which is formed of two sections of similar size.

One difference between the vapourizing units of the side portions and that of the upper portion is that an animal detecting unit is provided in the side portions. In the embodiment illustrated, the detecting unit comprises a pair of infra-red components 80 and 82 which, as illustrated in FIG. 4, are mounted to the upper part of plate 58 by means of an arrangement of two abutting blocks 84 and 86 (see FIG. 5). The infra-red components 80 and 82 (ommitted in FIG. 5) is electrically connected to the control module 46 by means of a pair of electrical wires 88 and 90 (see FIGS. 3 and 4).

The particular inter-connection of the tubular connecting members 36 and 38 with their respective housings 30, 32 and 34 allows a telescopic and rotational adjustment for the spraying apparatus to be mounted to various sizes and configurations of livestock entranceways. Similarly, the particular inter-connection of the nozzle carrying plates which are rotatably adjustable in their associated housings allows the latter to be moved at various angles, such as 90° between the position shown in FIG. 1 and that shown in FIG. 2.

Various considerations are to be taken in the operation of the spraying operation, such as spray fluid pressure adjustment, the sparying cycle, etc. However, this is not within the purview of the present invention and will not be described.

Although the invention has been described above with respect with one specific form, it will be evident to the person skilled in the art that it may be modified and refined in various ways. For example, the detecting unit could be mounted in the upper vapourizing unit or elsewhere in the entranceway. It is therefore wished to have it understood that the present invention should not be limited in scope, except by the terms of the following claims.

The embodiments of the invention in which an exclusive property or privilege is claimed are defined as follows:

1. An animal spring apparatus adapted to be mounted to entranceway frames of varying dimensions, each frame being defined by a head and two opposite side jambs, comprising:
   (a) an inverted U-shaped tubular structure consisting of a pair of opposite side portions adapted to be mounted to the side jambs of the entranceway and an intermediate horizontal upper portion adapted to be mounted to the head of the entranceway, each of said upper and said side portions including
      (i) a vapourizing unit consisting of a housing adapted to be mounted to the entranceway frame and of nozzle carrying means mounted to said housing; and
      (ii) tubular connecting members each having one end telescopically received in the housing of said upper portion and an opposite end thereof telescopically received in the housing of an adjacent one of the side portions whereby the tubular structure may be mounted according to the dimensions of the entranceway frame by telescopically adjusting the relative positions of said one end and said opposite end of said connecting members in said housings;
   (b) means mounted on said tubular structure for detecting the presence of an animal in the entranceway; and
   (c) means extending in said housings and said connecting members for directing spraying fluid from a remote reservoir to said nozzle carrying means when an animal is present in said entranceway.

2. An animal spraying apparatus as defined in claim 1, wherein said head and side jambs of said entranceway frame have surfaces extending in planes parallel to the direction of passage of an animal through said entranceway; each said housing having a planar rear wall mounted against one of said surfaces.

3. An animal spraying apparatus as defined in claim 1 wherein, said head and said side jambs of said entranceway frame have surfaces extending in planes perpendicular to the direction of passage of an animal through said entranceway; each said housing having a planar rear wall mounted against one of said surfaces.

4. An animal spraying apparatus as defined in claim 1, wherein each said nozzle carrying means is rotatably adjustable relative to said housing associated therewith.

5. An animal spraying apparatus as defined in claim 1, wherein each said housing is rotatably adjustable relative to said connecting member associated therewith.

6. An animal spraying apparatus as defined in claim 1, wherein each said housing consists of a cylindrical chamber having one open end adapted to receive said one end of said connecting member; said chamber having a cut-out portion adapted to rotatably receive said nozzle carrying means therein.

7. An animal spraying apparatus as defined in claim 1, wherein said means for detecting the presence of an animal in the entranceway are mounted to the nozzle carrying means of each opposite side portion of said tubular structure.

* * * * *